(12) United States Patent
Gastaldi et al.

(10) Patent No.: US 9,037,980 B2
(45) Date of Patent: May 19, 2015

(54) METHOD OF PROVIDING ASSISTANCE TO THE END-USER OF A SOFTWARE APPLICATION

(75) Inventors: Christian Gastaldi, Nice (FR); Alexis Grandemange, Le Cannet (FR); Richard Savornin, Valbonne (FR)

(73) Assignee: Amadeus S.A.S., Biot (FR)

( * ) Notice: Subject to any disclaimer, the term of this patent is extended or adjusted under 35 U.S.C. 154(b) by 45 days.

(21) Appl. No.: 12/930,226

(22) Filed: Dec. 30, 2010

(65) Prior Publication Data

US 2012/0166970 A1 Jun. 28, 2012

(30) Foreign Application Priority Data

Dec. 28, 2010 (EP) .................................. 10306534

(51) Int. Cl.
*G06F 3/0481* (2013.01)
*G06Q 10/10* (2012.01)
(52) U.S. Cl.
CPC ...................................... *G06Q 10/10* (2013.01)
(58) Field of Classification Search
CPC ....................................................... G06F 3/048
USPC ......................................................... 715/753
See application file for complete search history.

(56) References Cited

U.S. PATENT DOCUMENTS

| | | | | |
|---|---|---|---|---|
| 2006/0101510 A1* | 5/2006 | Kadyk et al. | ...................... | 726/12 |
| 2009/0086957 A1* | 4/2009 | Kelley et al. | ............. | 379/265.09 |
| 2009/0228801 A1* | 9/2009 | Lee et al. | ...................... | 715/730 |
| 2010/0049797 A1* | 2/2010 | Ryman | .......................... | 709/203 |
| 2011/0296303 A1* | 12/2011 | Duquene et al. | .............. | 715/704 |

OTHER PUBLICATIONS

Richard Atterer et al. "A Proxy-Based Infrastructure for Web Application Sharing and Remote Collaboration on Web Pages" (Human-Computer Interaction-INTERACT 2007, Lecture Notes in Computer Science vol. 4662, Sep. 2007, pp. 74-87).*

(Continued)

*Primary Examiner* — Jennifer To
*Assistant Examiner* — Xuyang Xia
(74) *Attorney, Agent, or Firm* — Wood, Herron & Evans, LLP

(57) ABSTRACT

A method of providing assistance to a remote end-user of an end-user software application from an agent of an assistance center is described. All the transactions initiated by the end-user of the end-user software application are recorded in a contextual database locally, for applications running exclusively on customer PC, or remotely, for Web applications. Instrumented pages are delivered to the end-user. They include each a help request means. A server of a desktop sharing application is installed in the PC of the agent. When the end-user is requesting assistance all the entries already made by the end-user on a current instrumented page are uploaded. A waiting page and a client side of the desktop sharing application are also downloaded to the PC of the end-user. The end-user to be assisted is assigned to the agent when available. Then, PC of the agent gets a clone of the current instrumented page from the contextual database and a secure communication tunnel between the agent and the end-user is established. The client side of the desktop sharing application is finally activated on the customer PC which lets end-user view desktop of the PC of the agent and allows starting an assistance session between the agent and the end-user. All that being done without any software pre-installation on the client PC.

20 Claims, 8 Drawing Sheets

(56) References Cited

OTHER PUBLICATIONS

European Patent Office, International Search Report issued in related International application No. PCT/EP2011/074124 dated Jan. 24, 2012.

Wannous et al., "NVLab, a Networking Virtual Web-Based Laboratory that Implements Virtulaization and Virtual Network Computing Technologies", IEEE Transactions on Learning Technologies, IEEE, vol. 3, No. 2, Apr. 1, 2009.

Hsieh, et al., "Stateful session handoff for mobile WWW", Information Sciences, Amerstam, NL, vol. 176, No. 9, May 8, 2006.

Ardaiz et al., "Sharing Application Sessions for Peer-to-Peer Learning", Computational Science and Engineering, 2009. Piscataway, NJ, Aug. 29, 2009.

IP Australia, Examination Report issued in Patent Application No. 2011351386 dated Aug. 7, 2014.

* cited by examiner

METHOD OF PROVIDING ASSISTANCE TO THE END-USER OF A SOFTWARE APPLICATION

FIELD OF THE INVENTION

The present invention relates generally to help desks and other call centers that provide assistance to the end-users of sophisticated software applications. It more particularly describes a method of providing assistance which does not require any cumbersome or complex installation of software in the PC of the end-user while enabling an effective two-way communication channel between the end-user and the agent of the assistance center.

BACKGROUND OF THE INVENTION

The proliferation of online commercial applications in the recent years has triggered the deployment of highly interactive and sophisticated software applications by various types of providers of services and goods. Based on the client/server model of the Internet the applications are run on remote servers and accessed by customers that connect to them from their data processing devices, such as personal computers (PCs), operating any one of the few freely available client software applications known as browsers or navigators. These servers are also designated in the present application by application server. Possibly accessed from all over the world, the myriad of servers and their countless end-users constitute the world-wide-web, or just the web, establishing connections through a mix of interconnected private and public networks forming what is broadly referred to as the Internet.

As shown in FIG. 1a, in this computing and networking environment, a customer needs just to connect, from a PC 100, to a remote server 150 implementing a web site to have access to any particular software application the server is running and from which customer intends to obtain services. Such web sites are for example set up by travel service providers and airline companies to allow travelers booking and paying online air trips without having to visit a travel agency.

While early web sites were straightforward to use and often limited to the mere consultation of a set of pages providing static information possibly updated once in a while, sophisticated interactive web sites have been since developed mainly by commercial organizations that sell goods and services such as the travel service providers mentioned above. Also, all sorts of institutions and administrations have set up web sites that allow completing complex administrative tasks including, e.g., electronic filing of income tax forms along with their online payment.

Because of the complexity of the tasks that are now handled by such interactive web sites it is not infrequent that customers, and in general end-users of these software applications, experience problems to get all the necessary electronic transactions completed successfully between server and client applications. All sorts of problems are potentially encountered such as, for the end-user, of not being able to properly fill all the fields of an electronics form returned by the application. For instance the end-user may not know in what exact form an answer must be formatted or just does not understand what information is to be provided. Also, many incompatibilities may potentially exist between server application and client software versions which may render the completion of a certain task difficult and that the casual user of the website may not be able to overcome alone. Also, many commercial applications, to keep client interface simple and straightforward to use, do not purposely implement all the possible options for the services they are providing or the goods they are delivering.

In addition to web applications, problems may also arise with software applications that are run locally but not on a server remotely located. Indeed, a user of locally run software application may also encounter difficulties when installing or running the software application.

As a consequence, some organizations that set up websites or that develop locally run software provide a means for requesting assistance when a problem is encountered by end-users and to handle customer requests that would not be imbedded in the user interface. This most often takes the form of a help desk or call center end-users must call to get assistance from anyone of a group of available agents having a level of expertise sufficient to handle most of the problems encountered in the field by end-users of these websites and by online customers.

Modern help desks, particularly those put in place by large commercial and institutional organizations, use very sophisticated tools to expedite the handling of the calls they receive. A very effective technique in use manages to eventually have the help desk agent viewing on his/her own terminal what is displayed on the PC of the end-user or customer who has initiated the call. The agent can then much more quickly understand what poses a problem in the session opened by the end-user of the application server.

Tools that let one or more third-party computers display a remote computer desktop are indeed in widespread active use in many areas not limited to the field of help desks and remote assistance. VNC which stands for virtual network computing is such a graphical tool largely used for desktop sharing. In any case it is remote control software which allows viewing and interacting with one computer desktop using a program on another computer desktop anywhere on the Internet. As shown in FIG. 1b a VNC server software component must however be installed on the computer to be watched 100, i.e., the one of the end-user or customer that has requested help while the light piece of software, the VNC viewer, is on the agent's computer 400. If VNC is thus very effective to remotely display a desktop it implies that to be able to benefit of this type of assistance the end-user must have first installed the VNC server software on his/her own computer. Component having functions similar to the one of the VNC server are designated in the application by server of a desktop sharing application.

A problem that arise with existing solutions is that VNC server is becoming potentially at risk behind the customer firewall 110, essentially devised to protect customer web client applications, unless it is carefully configured to be operated in the specific customer environment and stay safe while it becomes potentially the subject of many attacks from the network it is connected to. Yet, not all PC users are computer literate which renders existing solutions often risky for the security of the end-user's computer.

Therefore there is a need for a solution that provides help without increasing end-user's computer security or without previously requiring a complex configuration.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method of providing an end-user of an end-user software application with assistance from an agent of an assistance center over a network operating in a client/server mode allowing communication between a data processing device of the end-user associated to end-user display means, the end-user software application enabling the end-user to establish an end-user session and a data processing device (PC) of the agent associated to agent display means. The method comprises the following steps performed with at least one data processor:

- installing a server side of a desktop sharing application in the data processing device of the agent;
- storing in data storage means a contextual database, preferably linked to the end-user software application, and that records the actions initiated by the end-user and which characterize the end-user session;
- getting a clone, also referred as duplication, of the end-user session at the data processing device of the agent by running an agent software application and by obtaining a duplication of said end-user session based on said actions;
- displaying on the agent display means the clone of the end-user session,
- establishing a communication between the data processing device of the agent and the data processing device of the end-user through the network;
- activating in the data processing device of the end-user a client side of the desktop sharing application to allow viewing on the end-user display means what is displayed on the agent display means;
- starting an assistance session between the agent and the end-user.

Thus, the invention provides a solution where the end-user does not have to install a VNC server on its computer while allowing communicating with a remotely located agent. Security of the end-user's computer is therefore not decreased while allowing assistance.

Additionally, installing in the data processing device of the end-user a client side of a desktop sharing application can be handled more easily than installing a server side of a desktop sharing application. Yet, with existing solutions, efficiency of VNC or any equivalent tool is seriously impaired by the need of having first to install a cumbersome software application, the VNC server side, on customer PC's. Indeed, not all PC users are computer literate and many are anyway reluctant to install any new piece of software of which they have not an everyday obvious need.

Therefore, the invention allows providing the end-user with hotline support without requiring cumbersome modification architecture or pre-installation on the client installation.

The end-user software application can be a software application run locally on the data processing device of the end-user. The end-user software application can also be an online software application run by a processor remotely located such as a web server. Typically, the end-user software application can be an online software enabling online booking or reservation of transportation services.

In the present invention, an end-user session is a session during which the end-user uses the end-user software application. As the end-user software application can be run locally i.e. run by the data processing device of the end-user or can be remotely run, typically run by a remotely located server, then the term session embodies as well local work sessions as sessions on public or private networks.

In the present invention, data processing means of the end-user and data processing means of the agent may for instance be respectively personal computers (PC), smart phones, personal digital assistants (PDA) etc.

Another advantage of the present invention is that it provides a way of helping and informing a user more simply and efficiently than what can be accomplished by existing assistance solutions.

Indeed, although existing solutions allow the held desk agent to see what is displayed on the user screen, everything must be orally explained over the phone to the end-user in the hope he/she will be able to complete successfully the transaction initiated with the supported website or local end-user software application. This part of the assistance provided by existing help desk is still thus not very effective. By enabling the agent to see what is displayed on the user' screen, the invention significantly enhances the efficiency of help desk assistance.

Preferably, the method according to the invention comprises at least one of the following optional features.

- Getting a clone of the end-user session includes identifying the page or interface that is displayed on the data processing device of the end-user. The page or interface may or may not comprise entries made by the end-user. Preferably, getting a clone of the end-user session includes duplicating all entries already inputted by the end-user on a page of the end-user session currently displayed on the end-user display means and that have not been processed yet by the end-user software application. Thus, the actions initiated by the end-user and which characterize the end-user session comprise entries, also called input, already processed by the end-user software application and entries not yet processed by the end-user software application.
- In the present application, duplicating the end-user session or getting a clone of the end-user session means that the page that is currently displayed on the display means of the data processing means of the end-user is duplicated. Thus, if necessary all actions made on previous pages and that are mandatory for obtaining the currently displayed page are re-played based on the recorded context in order to duplicate the end-user session. In a preferred but non limitative embodiment, even the entries already made by the end-user and that have not been processed yet are also duplicated.
- The assistance session includes opening various sorts of files, documents and videos available in an electronic form in the data processing device of the agent for being displayed on the end-user display means. This is possible without requiring the installation of any specific application for opening these files on the data processing device of the end-user.
- Getting a clone of the end-user session requires requesting the assistance of the agent from the end-user data processing device. According to a first embodiment, requesting assistance includes activating help requesting means embedded in a page of the end-user session that is displayed on the end-user display means. According to a second embodiment, requesting assistance includes requesting an executable link, receiving said executable link at the end-user data processing device and accessing said executable link. Said executable link is typically an URL link. Preferably, requesting an executable link implies giving a phone call or sending a message to the agent.
- Preferably, the step of establishing a communication comprises configuring a tunnel between the server side of the desktop sharing application and the client side of the desktop sharing application for displaying on the end-user display means what is displayed on the agent display means.

An assistance service application has a client side in the data processing device of the agent and a server side remotely located from the data processing device of the end-user and which communicates through the network with the data processing device of the agent and with the data processing device of the end-user. The server side of the assistance service application performs the following steps:
- receiving from the data processing device of the end-user a request for assistance,
- sending to the client side of the assistance service application a request for assistance assignment,
- receiving an acceptance of assignment from the client side of the assistance service application,
- establishing a communication between the server side of the desktop sharing application and the client side of the desktop sharing application for displaying on the end-user display means what is displayed on the agent display means.

The step of establishing a communication comprises configuring a tunnel between the server side and the client side of the desktop sharing application by carrying on the following steps:
- disposing a tunneling server at the data processing device of the agent,
- disposing a tunneling proxy at the server side of the desktop sharing application,
- connecting said tunneling server and said tunneling proxy.

Preferably, the server side of the assistance service application receives a notification from the client side of the assistance service application which indicates that the data processing device of the agent is ready for communicating with the data processing device of the end-user.

The server side of the assistance service application is configured to carry out the following steps:
- after receiving the request for assistance and before sending a request for assistance assignment, retrieving all entries performed by the end-user and that has not been yet processed or transmitted to the end-user software application,
- after receiving an acceptance of assignment, sending to the client side of the assistance service application all entries performed by the end-user and that has not been yet processed or transmitted to the end-user software application.

Said all entries or input are gathered in a query string and the server side of the assistance service application sends the query string to the client side of the assistance service application.

The server side of the assistance service application is configured to carry out the following steps: after receiving the request for assistance and before sending a request for assistance assignment, attributing a context identifier that uniquely defines the session of the end-user; after receiving an acceptance of assignment, sending to the client side of the assistance service application the context identifier that uniquely defines the session of the end-user.

The server side of the assistance service application is configured to carry out the following step: after receiving from the data processing device of the end-user a request for assistance, sending to the data processing device of the end-user a waiting page.

The server side of the assistance service application is configured to carry out the following step: after receiving from the data processing device of the end-user a request for assistance, sending to the data processing device of the end-user a page with an applet that embeds the client side of the desktop sharing application. When executed, the applet loads the client side of the desktop sharing application. Thus, only the server side of the desktop sharing application is in the data processing device of the agent. No intrusive or cumbersome application needs to be installed or pre-installed by the end-user.

The server side of the assistance service application is configured to carry out the following step: after receiving from the data processing device of the end-user a request for assistance, sending to the data processing device of the end-user a password that is associated to the end-user session and that is necessary to connect the data processing device of the agent. The password is received from the client side of the assistance service application. Advantageously, said password is randomly changed at each new request for assistance.

The step of duplicating all entries includes providing the end-user with an executable applet which is, once executed, arranged for collecting all entries already made by the end-user on a page of the end-user session currently displayed on the end-user display means and that have not been processed yet by the end-user software application.

An assistance service application has a client side in the data processing device of the agent and a server side remotely located from the data processing device of the end-user and which communicates through the network with the data processing device of the agent and with the data processing device of the end-user. The client side of the assistance service application performs the following steps:
- receiving from the server side of the assistance service application a request for assistance assignment,
- providing the agent with means for accepting or rejecting said request for assistance assignment,
- if the agent accepts said request for assistance assignment, then establishing a communication between the client side of the desktop sharing application and the server side of the desktop sharing application for displaying on the end-user display means what is displayed on the agent display means.

The step of establishing a communication comprising configuring a tunnel between the server side of the desktop sharing application and the client side of the desktop sharing application for displaying on the end-user display means what is displayed on the agent display means.

The step of configuring a tunnel comprises connecting a tunneling server of the data processing device of the agent to a tunneling proxy at the server side of the desktop sharing application.

According to a first embodiment, the invention may further comprise any one of the following optional features:

The end-user software application is run on a software application server remotely located from the data processing device of the end-user.

The end-user software application is a web-based application running from a web server. Thus, the end-user software application is an online software application. Preferably, the data processing device of the end-user accesses the web server through a web browser.

According to an exemplary embodiment, the end-user software application is a web-based travel application running from a web server operated for instance by a travel service provider and the end-user is a customer accessing the web server for booking, purchasing or obtaining information regarding travel services through a data processing device installed web browser.

According to an embodiment, the software application server is also the server side of the assistance service application. More generally, the software application server and the server side of the assistance service application are run on the same machine. According to an alternative embodiment, the software application server and the server side of the assistance service application are distinct servers. Preferably, the software application server and the server side of the assistance service application are remotely located. Typically, they are operated by distinct entities. For instance, the software application server is operated by a provider of travel services or a provider of any desktop software application for work, leisure activity, travel and tourism and the server side of the assistance service application is operated by a company providing software assistance.

Said software application server is linked to the contextual database.

The network for running the end-user software application from the data processing device of the end-user or from the data processing device of the agent is preferably the same as the network for establishing a communication between the end-user and the agent. In another embodiment, the network for running the end-user software application from the data processing device of the end-user or from the data processing device of the agent is different from the one for establishing a communication between the end-user and the agent.

According to a second embodiment, the invention may further comprise any one of the following optional features:

The end-user software application is run on the data processing device of the end-user. The data processing device of the end-user comprises storage means for storing the contextual database. The end-user software application is linked to the contextual database.

The end-user software application is instrumented to record the actions initiated by the end-user in the contextual database. Therefore, the end-user software application is configured to recorded locally, i.e., at the processing device of the end-user, the context of the end-user session.

Typically, the end-user software application is a desktop application.

The end-user software application is instrumented to send to the server side of the assistance service application all entries not yet recorded in the contextual database.

The server side of the desktop sharing application can retrieve the context of the end-user session. Thus, the server side of the desktop sharing application can run the end-user software application at the processing device of the agent and based on said context. Therefore, the end-user session can be duplicated at the processing device of the agent.

The invention may also comprise any one of the following optional features:

In a specific embodiment, the end-user software application is a graphic suite of software tools or any office software suite of tools. It may be run under the control of PC operating system, i.e., Windows for instance.

According to a specific embodiment, the agent software application that is run for obtaining a duplication of said end-user session is the same software application as the one of the end-user software application. This means that the agent and the end-user software application are the same piece of software. It may be run from a single machine or from a single pool of machines. According to another embodiment, the agent software application that is run for obtaining a duplication of said end-user session is different from the end-user software application. In that latter case, the agent software application can either:

be a copy of the end-user software application. In that case, end-user and agent software applications are two pieces of software. They are preferably run from two different machines.

be different while having at least the functionalities of the end-user software application. Preferably, all actions that are available with the end-user software application are available with the agent software application. End-user and agent software applications can be two versions of a software application, a first version being dedicated to end-users and a second version being dedicated to agents.

The customer may be here assumed to be using a sophisticated web application, i.e., from web sites assuming a high level of interactions between server and client sides and, generally, where forms have to be filled. Preferably, the end-user software application allows at least one of the following actions: booking or purchasing goods or services, fulfilling administrative declaration such as income taxes declaration, fulfilling request for information. The end-user software application may also relate to the travel and tourism industry. Then, it may allow booking or purchasing goods or services related to travel products; processing a check-in, booking a ticket, modifying a ticket or a booking etc. The end-user software application may also be a local application dedicated to work or to entertainment. Then, it may allow calculating, drawing, typing, playing games etc.

Another object matter of the present invention is a method of providing assistance to an end-user of an end-user software application from an agent of an assistance center over a network operating in a client/server mode allowing communication between the end-user software application, a data processing device (PC) of the agent associated to agent display means and a data processing device of the end-user associated to end-user display means, characterized in that it comprises the following steps performed with at least one data processor:

storing in data storage means a contextual database that records actions initiated by the end-user and which characterize the end-user session;

providing the data processing device of the agent with a duplication of the end-user session, said duplication being based on said actions;

establishing a communication between the data processing device of the agent and the data processing device of the end-user through a network;

activating in the data processing device of the end-user a client side of the desktop sharing application to allow viewing on the end-user display means what is displayed on the agent display means;

starting an assistance session between the agent and the end-user.

Another object matter of the present invention is a computer program product stored on a non-transitory computer readable storage medium, comprising computer readable code means adapted for causing at least one computer to operate the method according to any one of the previous features.

Another subject matter of the present inventions relates to a system for providing an end-user of an end-user software application with assistance from an agent of an assistance center operating in a client/server mode comprising a data processing device of the end-user associated to end-user display means, a data processing device of the agent associated to agent display means, a desktop sharing application comprising a server side and a client side and a network configured to allow communication between the end-user software application and the data processing devices of the end-user and of the agent. The server side of the desktop sharing application is installed in the data processing device of the agent and the client side of the desktop sharing application is installed in the data processing device of the end-user. The system of the invention comprises:

- data storage means comprising a contextual database that is preferably linked to the end-user software application and that is configured to record the actions initiated by the end-user and which characterize the end-user session;
- at least one processor configured to run an assistance service application, the assistance service application being arranged for:
  - providing the data processing device of the agent with a duplication of said end-user session by running an agent software application based on said actions;
  - displaying on the agent display means the duplication of the end-user session,
  - establishing a communication between the data processing device of the agent and the data processing device of the end-user through the network to allow viewing on the end-user display means what is displayed on the agent display means, starting thereby an assistance session.

More precisely, all the transactions initiated by the end-user of the end-user software application are recorded in a contextual database, locally for applications running exclusively on customer PC, or remotely, for online or Web applications. Instrumented pages or interfaces are delivered from the application server or from the local application respectively to the end-user. They include each a help request means. A server side of a desktop sharing application is installed in the PC of the agent. When the end-user is requesting assistance by activating the help request means all the entries already made by the end-user on a current instrumented page or interface are uploaded to the application server. A waiting page and a client of the desktop sharing application are also downloaded to the PC of the end-user. The end-user to be assisted is assigned to the agent when available. Then, PC of the agent gets a clone of the current instrumented page from the contextual database of the application server including all entries already made by the end-user. A secure communication tunnel between the agent and the end-user is established through the public network. The client side of the desktop sharing application is finally activated which lets end-user view desktop of the PC of the agent and allows starting an assistance session between the agent and the end-user. All that being done without any software pre-installation on the client PC.

DETAILED DESCRIPTION

The following detailed description of the invention refers to the accompanying drawings wherein like numerals in all above figures refer to like functions and components. While the description includes exemplary embodiments, other embodiments are possible, and changes may be made to the embodiments described without departing from the spirit and scope of the invention.

Figure 2B:
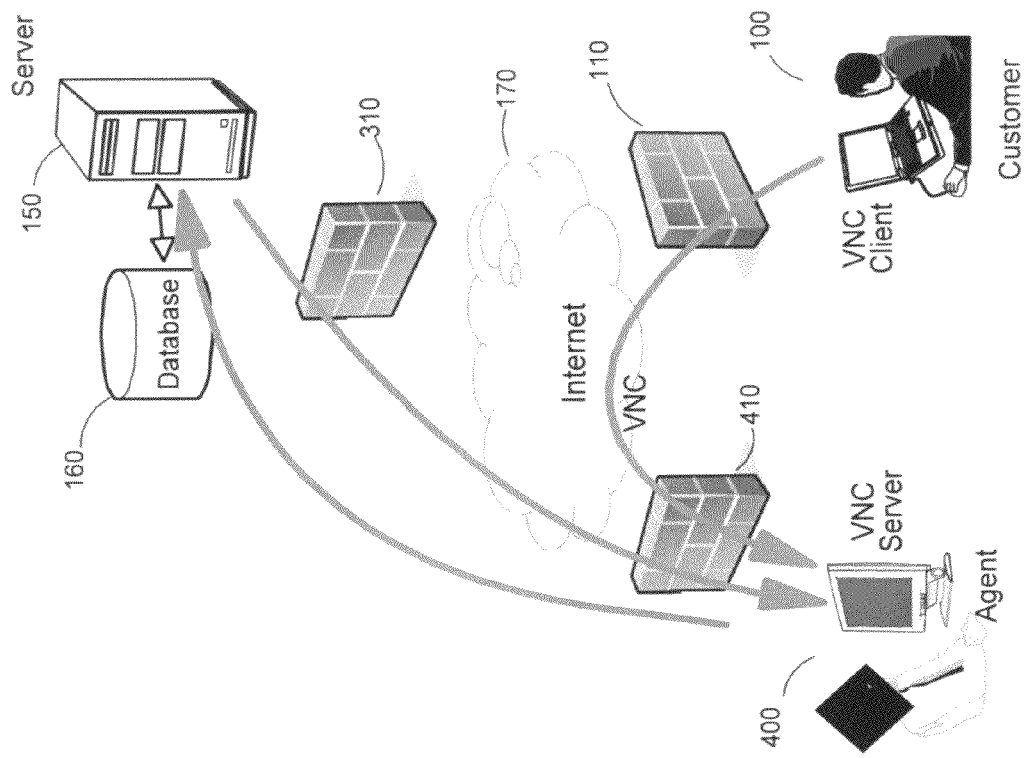
FIGS. 2a & 2b illustrate an assistance center organized according to an embodiment of the invention allowing an end-user to view agent's desktop and agent to view a clone of the page from where end-user has requested assistance. These figures illustrate a specific but non limitative embodiment of the invention wherein the end-user software application is run from a server remotely located from the computer of the end-user.
Figure 2A:
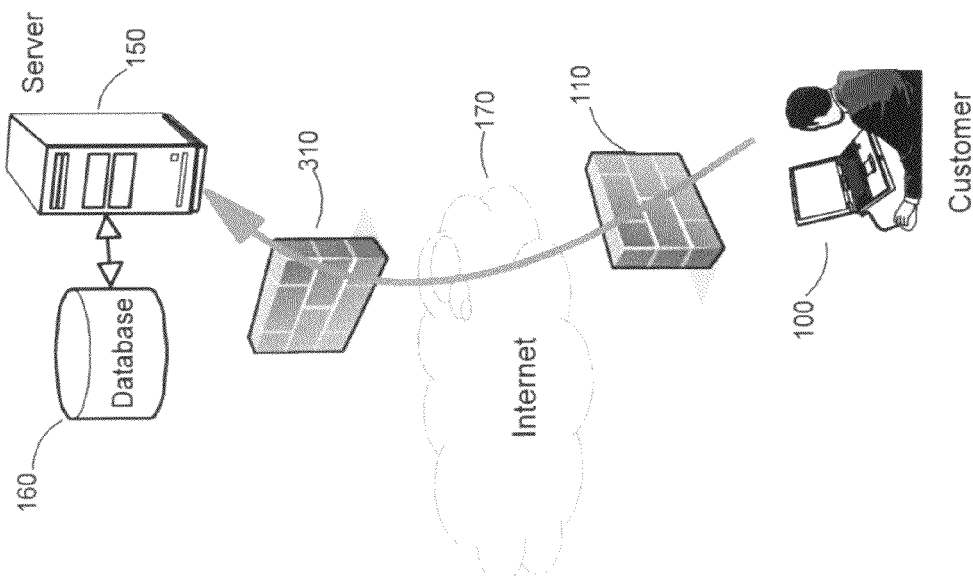

The FIGS. 2a and 2b are an overall description of a help desk or customer support center system according to a specific but not limitative embodiment of the invention, where agents are committed to providing help to end-users and customers of an end-user software application 200 they are supporting. The end-user software application 200 has a server side and a client side which displays a web page 121 on display means of the end-user. In this embodiment, the end-user software application 200 is an online software application.

As long as the end-user or customer 100 who has accessed a supported remote server application 150 does not have any difficulty to use an end-user software application 200 nothing appears to be different on the client side as compared to what happen with other regular websites implementing all sorts of online applications.

However, as shown in FIG. 2a, for a remote server software application or a website supported by a help desk or customer support center according to the invention, a difference is that a contextual database 160 is always kept updated in the background for all the sessions opened by the end-users or customers 100 of the supported applications. In the present invention these sessions are also referred as end-user session. Other than that, all the transactions between server and client sides are regular transactions taking place through a combination of private and public networks, i.e., the Internet 170 and requiring that standard protections be put in place generally under the form of firewalls 110, 310, 410 to prevent attacks from the public network and keep transactions safe and secured. The role of the contextual database 160 is to record all is necessary to replicate, when needed, the end-user session opened by the end-user of the end-user software application with all the entered data. Then, the contextual database 160 keeps track of every action done by the end-user of the end-user software application 200 in order to allow the same duplicated page to be reached whenever it is necessary. These actions may for instance relate to authentication, history pages, entries in text boxes, clicked radio button, etc.

Then, if difficulties are encountered by an end-user of the end-user software application 200 or if a customer is seeking help from a support center while using a commercial site they are provided a means of requesting assistance. Depending on the application of the invention this may be accomplished in different ways that are further discussed in the following description. The end result however is that an agent 400 of the help desk is eventually committed to help the end-user or customer who has initiated the request.

Figure 1B:
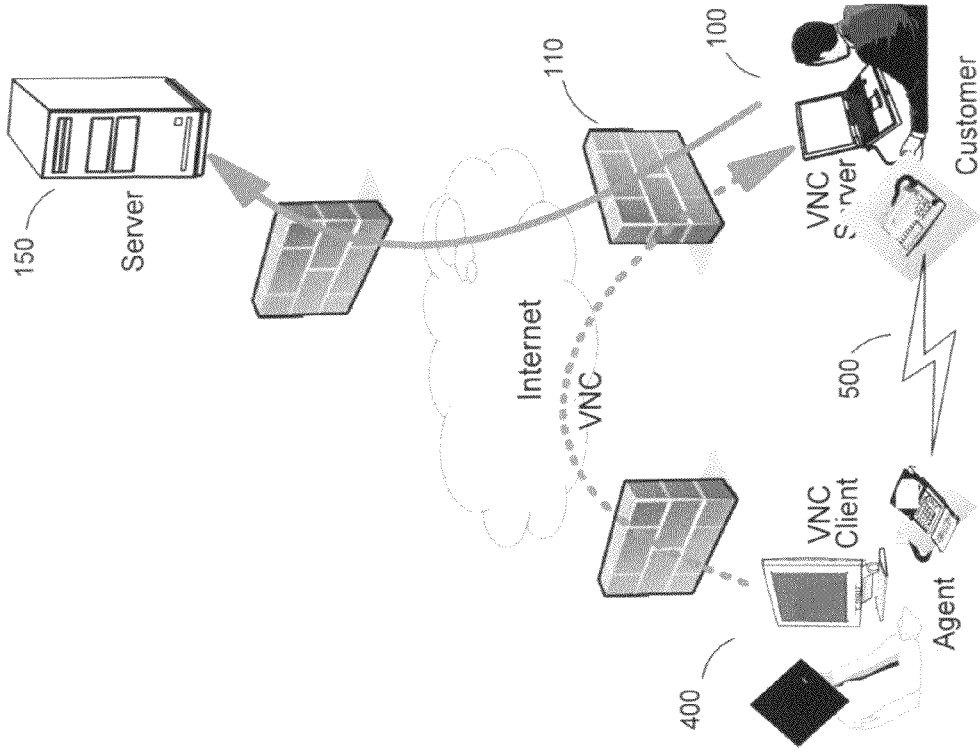
FIGS. 1a & 1b illustrate an assistance center of the prior art.
Figure 1A:
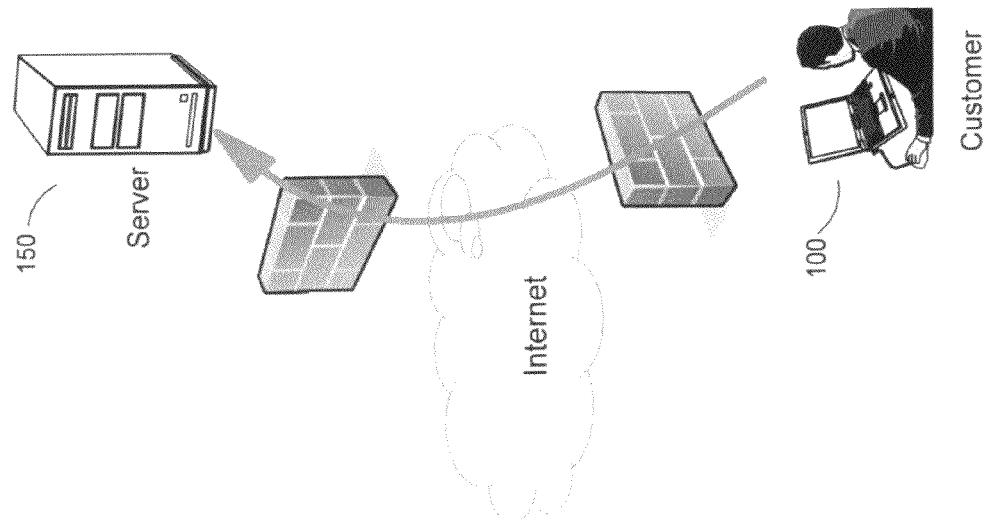

After which a communication channel is established between the agent and the end-user or customer using a desktop sharing application such as VNC discussed in the background section. As a reminder such desktop sharing application comprises a client side and a server side that are respectively designated in the present invention by client side of the desktop sharing application and by server side of the desktop sharing application. However, contrary to the standard use of VNC shown in FIG. 1*b* this is the client side of the desktop sharing application, the viewer part, which needs here to be operated on the computer (PC) of the end-user. VNC viewer, a light piece of software, does not require any prior installation and can be downloaded, e.g., under the form of an applet executable by the browser. Typically such applet is embedded in the corresponding web page fetched by the web browser run by the end-user or customer's PC 110. Hence, this fulfills an important object of the invention which is of not requiring the installation of any piece of software in end-user or customer's PC prior to requesting assistance from the help desk.

Through this communication channel an assistance session is initiated between the agent and the end-user.

The server side of the desktop sharing application is thus installed on PC of the agent. Agents and help desk professionals are obviously assumed to have the level of skill necessary to configure the server side of the desktop sharing application so that it can be safely operated behind a firewall 410. Conversely, end-users or customers are not required to be computer literate should they need to request assistance from a help desk agent. Also, to secure the transaction and to prevent anybody from connecting to agent's PC a new unique password is generated each time a new customer session is established. Then, only that new customer is temporarily authorized to access agent's PC. This also prevents a previous customer from staying connected, or reconnecting, and being able to see the data of the new customer. This is shown and further discussed in FIG. 6.

As a consequence this is the desktop also designated screen view of the help desk agent operating the server side of the desktop sharing application which can be simply viewed on the screen of the end-user PC. Agent has then all the freedom of showing from his/her own PC any kind of documents, presentations and videos that are likely to bring a much quicker and better answer to end-user concerns than what can be achieved through a single phone conversation. Help desk agent must not only be able to quickly understand the problem encountered by being able of viewing end-user desktop but he/she must have a way of showing directly to this latter any form of visual aids (document, tutorial, presentation, video, etc.) that helps completing the transaction if technical difficulties are encountered or just to better answer questions asked by customers of online commercial applications like the ones set up by the travel service providers mentioned earlier. PC of the end-user needs not to have the corresponding software applications installed since they are executed on PC of the agent and under his/her control. Even the most sophisticated applications can be used by agent and shown to the customer since it is only the desktop of PC of the agent which is remotely seen thanks to the VNC viewer downloaded on PC of the end-user.

This way of operating a help desk or a customer support center retains and extends the advantages of the traditional help desk described in the background section where agent, using VNC or a similar product, is able to see end-user desktop so that he/she can quicker and better understand what the end-user and customer concerns are.

As shown in FIG. 2*b* this part is accomplished from the contextual database 160 previously discussed and with the help of a corresponding software application run on servers supported by a help desk or customer support center according to the invention. By interrogating the supported server 150, agent is then also able to retrieve the entire context in which end-users and customers are when they express their concerns. End-user sessions can thus be replicated for the agent including all the data entered by the end-users until they decide to request assistance. This is further described in the following description through various examples of applications of the invention.

Although FIG. 2*b* shows an embodiment wherein a single server provides the agent with a duplication of the end-user session and runs the assistance service application, the invention also encompasses embodiments where a plurality of servers provide the agent with a duplication of the end-user session. In another embodiment, the server running the assistance service application and the end-user software application 200 are run on distinct servers.

Figure 3A:
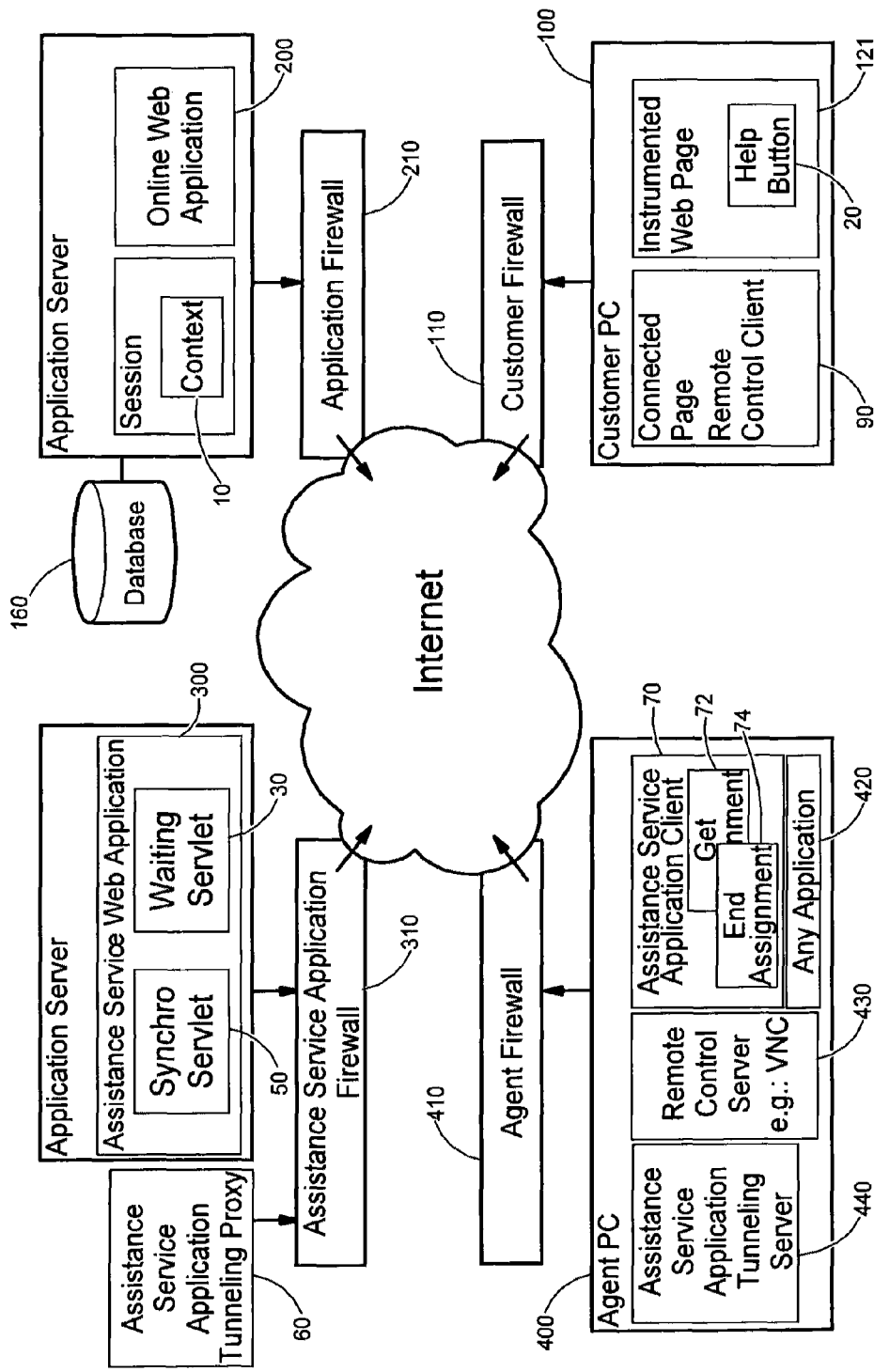
FIG. 3a shows the components of a system according to the invention wherein assistance is requested by an end-user for a remote application running on a server remotely located from the computer of the end-user, such as a Web server.

A first application of the invention, depicted in FIG. 3*a* and referred to as online interactive travel agency (OLITA) in the following, indeed describes an online travel system which allows a great deal of interactions between a customer and a travel agent. FIG. 3*a* more generally illustrates the case of a customer seeking help while using from his/her PC any kind of online end-user software application 200 which is assumed to be, in this example, an online travel application without any lack of generality. The agent is supporting the customer from another specific server application, object of the invention, which is referred to as 'Travel@Home' or assistance service application 300, 70 in the present description and in FIGS. 3*a* and 3*b*. This latter application and the online end-user software application 200 are not necessarily hosted on a same server as it is assumed in FIG. 2*b*. In the general case the two applications are run on different servers owned by their respective service providers. The assistance service application is aimed at managing the assistance session, like selecting a travel agent in response to a customer request and retrieving the customer session context of the supported end-user software application 200 with which customer is experiencing difficulties. The assistance service application is also in charge of connecting customer and agent while establishing connections between the applications on different servers.

The assistance service application as a server side 300 also designated assistance service application server 300 and a client side 70 also designated assistance service application client 70.

Contrary to the numerous standard online travel sites available on the Internet the invention is assumed to provide the same level of interactivity that may exist between a traveler visiting a regular travel agency where an agent is taking care in person of the traveler, handling his/her requests and booking a trip on his/her behalf. Like in a regular travel agency customer connected to a service center according to the invention can be shown by a remotely located agent all sorts of documents available in an electronic form and can choose among travel products and options by viewing the desktop of agent's PC. No particular skill is assumed from the customer other than he/she must have a PC 100, an Internet connection and can connect to a web server from a PC installed browser. Otherwise, the assistance process is automated as explained here after.

If customer needs to discuss and see detailed information (picture of the hotel, location on a map, etc.) before booking a certain travel product he/she must call the assistance center supporting the here above online travel service 200, and from where a travel agent is eventually assigned the task of helping the calling customer. Calling and assignment of an agent can be achieved in many different ways, examples of which are further discussed in the following description. A traditional way consists in having customer calling a specific number, possibly a free of charge number, largely advertised, e.g., on each page of the supported end-user software application 200.

When getting in contact with the assigned agent, customer can briefly explain the purpose of the call. Then, agent initiates on his/her PC from the client side 70 of the assistance service application the creation of a web page on the assistance service server. The page called, e.g.: 'customerxx.html' 90 is thus becoming accessible from the web site 'www.TravelHome.com'. In this application of the invention the only action which is then expected from the customer is to launch the browser of his/her PC with the above Internet address or URL (uniform resource locator).

Prior to creating the above web page destined for the calling customer, agent supporting the assistance service application also starts from his/her PC a remote control server 430, e.g. a VNC server, and, for sake of security, an agent tunneling server 440. As already discussed a remote control password is automatically changed and set by the client side 70 of the assistance service application at each new connection request. It is then sent to the server side 300 of the assistance service application before creating the customer dedicated page 'customerxx.html' on 'www.TravelHome.com' site with a remote control client applet already set up with agent's VNC server password. The server side 300 of the assistance service application can then setup a tunnel proxy 60 to forward the messages from the customer remote control applet to the agent tunneling server 4401 that forwards them in turn to the agent remote control server 430 in order to create the web page 90.

Figure 4:
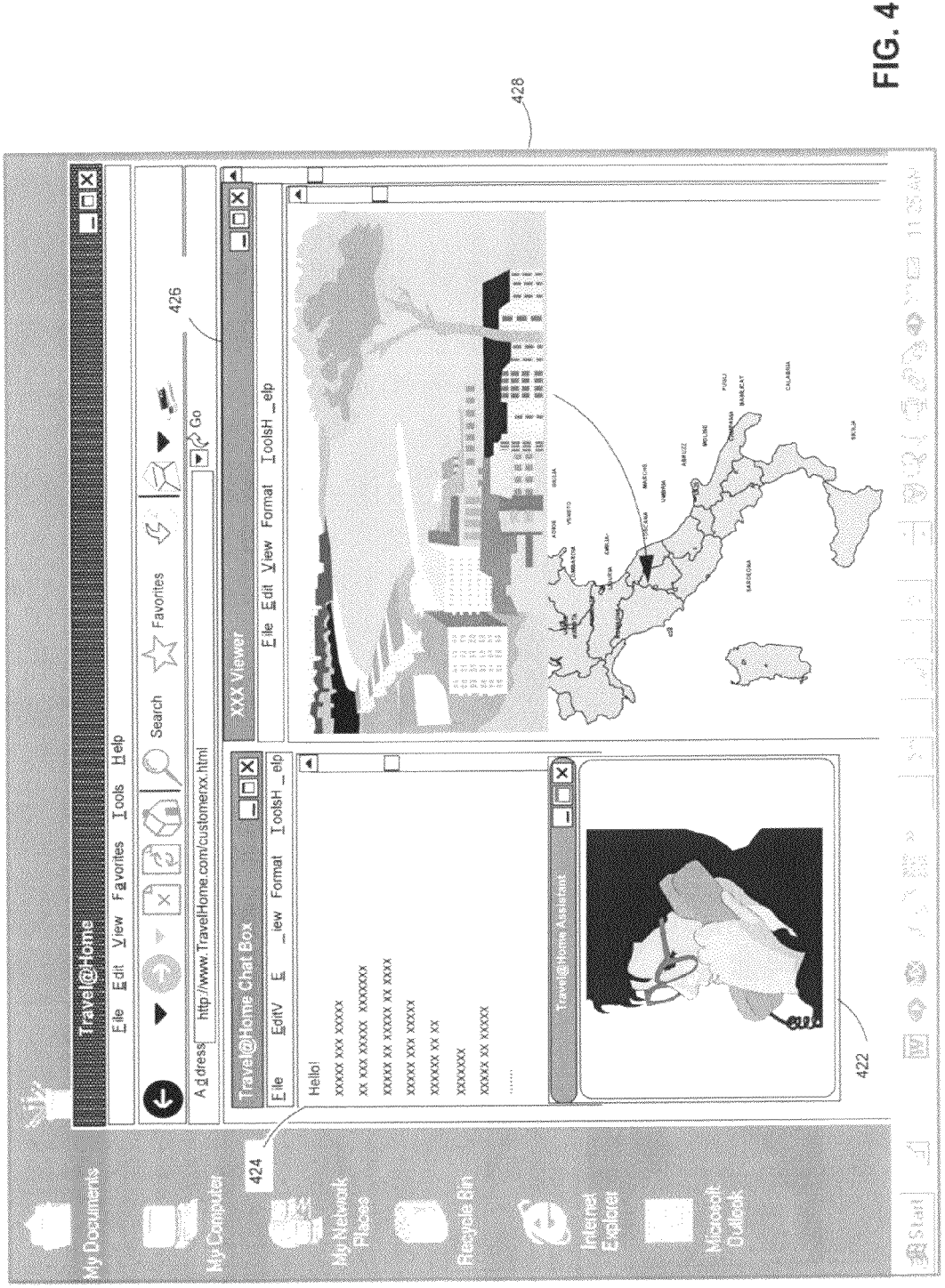
FIG. 4 shows an example of the agent's desktop as seen by the end-user including an instant messaging window and a webcam window.

Hence, when customer loads the page created by agent on his/her PC the remote control client applet is also loaded which automatically connects to the agent remote VNC server and display on the screen of customer's PC a replication of agent desktop 428 as shown in FIG. 4. PC of agent is, e.g., equipped with a webcam to display agent's face 422. Also, a chat application to establish a communication channel using typing (e.g., instant messaging) or voice can be started 424. As already discussed, agent can then open any kind of file on his/her PC 420 (PDF brochures, PowerPoint presentations, videos, etc.) so that customer can see them 426 with the downloaded client applet even though the corresponding viewing applications are not installed on his/her own PC. Furthermore, agent can upload any document such as brochures, contract, sell conditions, etc., on the assistance service application server to create one or more web pages that are further downloadable by customer.

When customer is satisfied and has all his/her questions answered agent can, from the assistance service application client 70, close the tunnel, stop the remote control server 430 and invalidate the password. Optionally, the agent can also complete any transaction on behalf of the customer if this latter agrees to do so.

Another application of the invention, more oriented to be used by help desks and hotlines, allows a simple and automated access to a remote customer's PC at the very exact point in the web end-user software application 200 where customer has decided he/she could not go further without getting help. This is also done without requiring any prior installation of software on remote customer's PC.

Figure 5:
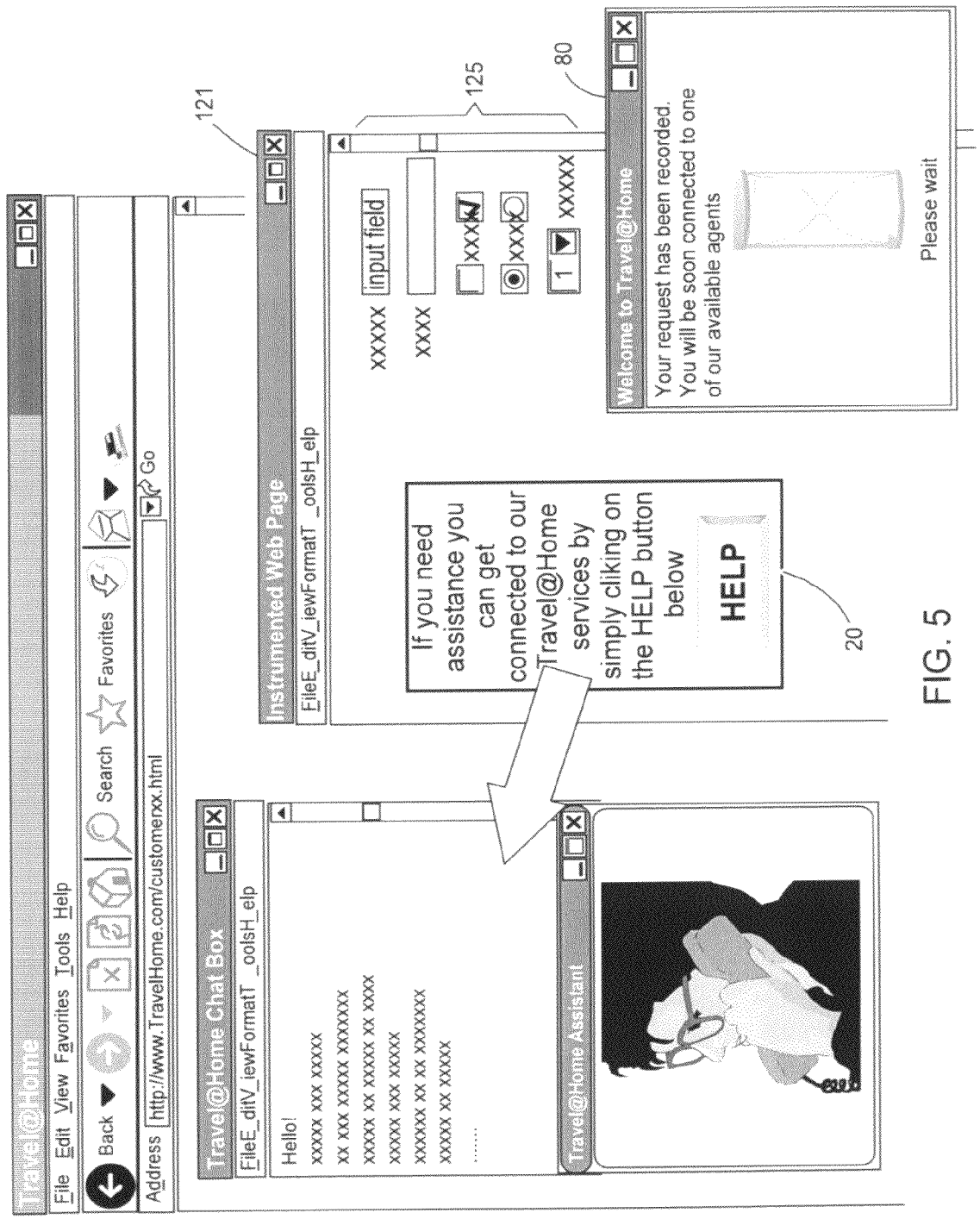
FIG. 5 shows an example of an instrumented page equipped with a help request means and an example of a waiting page displayed while an agent is being assigned the task of helping end-user.

The customer is here assumed to be using a sophisticated web end-user software application 200, i.e., from web sites assuming a high level of interactions between server and client sides and, generally, where forms have to be filled. This includes sites from online travel service providers and travel agencies, commercial sites delivering goods and services, and also sites of administrative and governmental organizations used, e.g., for income taxes declaration. As discussed previously, any application running on a server supported by a help desk according to the invention creates an end-user session for each customer where context is kept updated. According to this embodiment, the agent software application 200 is also the end-user software application 200 and runs on the same server or pool of servers as the end-user software application. The end-user software application or agent software application is then referred as web software application 200. In addition, agent is permitted to connect to the web software application 200 with a unique context identifier, also called context ID, provided when customer is seeking help by clicking on a 'help button' 20 located on the instrumented web page 121 as shown in FIG. 5. This action also gathers all entered pieces of information inputted on the current page by the customer and not yet known by the server, i.e., text and check boxes, radio buttons, drop-down lists, etc. 125. To this end, the Assistance service application server 300 comprises a waiting servlet 30 and a synchronization servlet 50. Context identifier and all has been keyed in the current page is automatically sent to the waiting servlet 30 of the assistance service application server 300 which initiates a request to the help desk. While request is being processed a waiting page 80 is returned to the customer as illustrated in FIG. 5.

The help desk agent committed to handle the request starts handling it by launching his/her 'Assistance service application client 70. This initiates the same connection process as in the OLITA case previously discussed. The assistance service application client also triggers a request to the assistance service application synchronization servlet 50 that returns an identifier uniquely identifying customer context in the web software application 200 along with the entry fields that were possibly inputted when customer clicked on the 'help button' 20. Then, the assistance service application can create a duplicated session destined for the agent including entries already inputted, if any, so that PC of agent displays exactly the same page as on customer's PC. These features can also be available for the previously described OLITA use case in order to duplicate all context, state and inputted data of the end-user session and make them available at the agent PC when the customer clicks on the URL sent by the agent. Therefore, help button and the URL link can be considered as help request means.

When connected with agent, using VNC or any equivalent desktop sharing system, customer also sees on his/her screen, as in OLITA application, a copy of agent desktop 90 that contains the same web software application 200 page, in the same state, as on his/her screen. Agent can then effectively support customer in many ways with the help of the webcam: possibly using the chat application to discuss of the problem encountered and/or showing what to do in agent environment so that customer can reproduce it. Depending on the application, as already mentioned above, customer may also let agent complete some or all steps of the process on his/her behalf in which case an approval step may have to be added prompting customer to approve the agent's actions. As with OLITA all sorts of documents, pictures and videos can be opened by agent and seen by customer and/or sent to server for being downloaded by this latter.

Figure 3B:
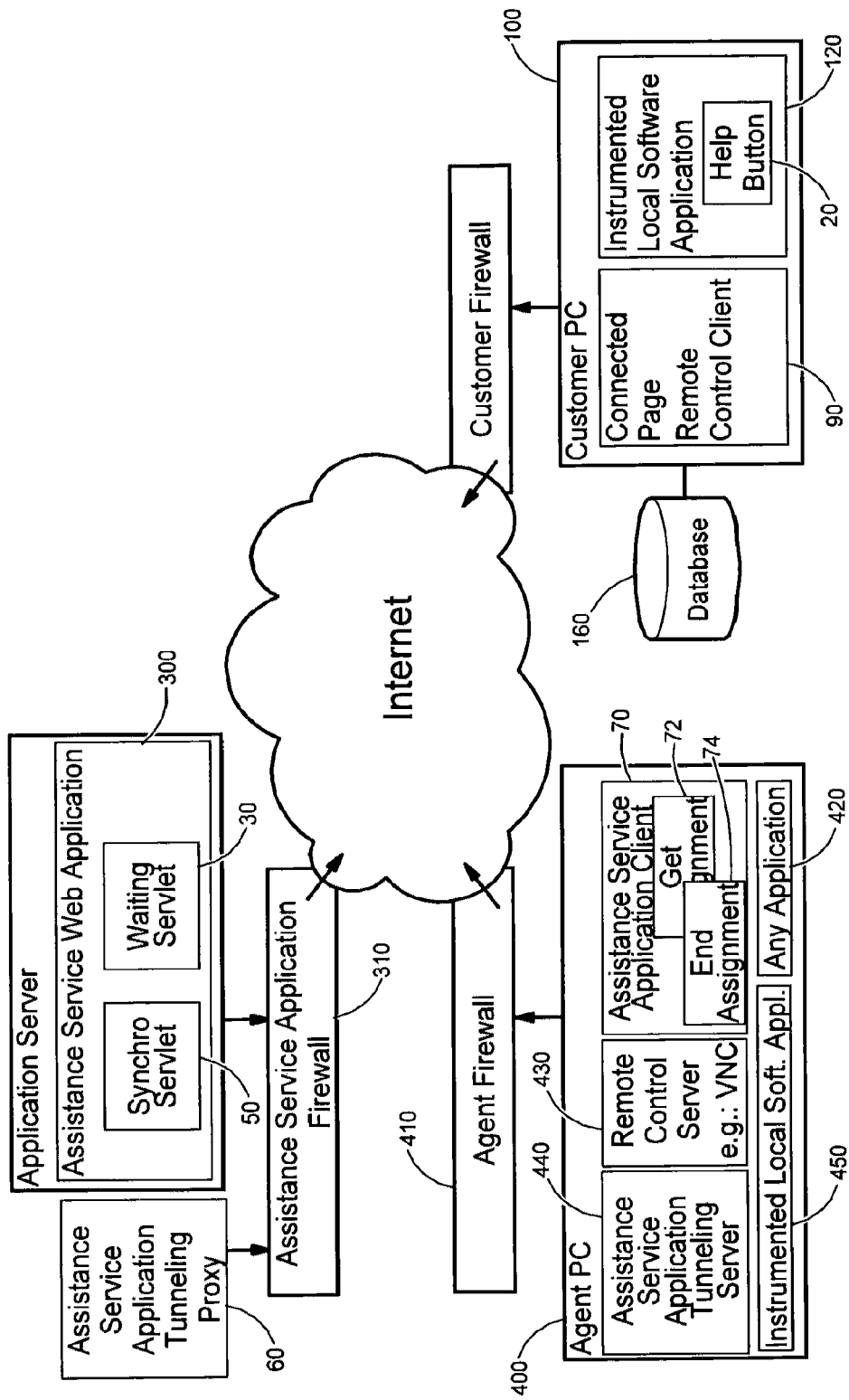
FIG. 3b shows the components of a system according to the invention wherein assistance is requested by an end-user for a local application running on the computer of the end-user.

FIG. 3b illustrates the case of a customer requesting assistance for an end-user software application 120 run completely under the control of his/her own computer. Such a local end-user software application 120 is for example a graphic suite of software tools or any office software suite of tools run under the control of PC operating system, i.e., Windows in most cases. The supported local end-user software application 120 must have been instrumented by its developer to provide the same level of functionalities as the supported web software application 200 of FIG. 3a. Especially, the invention assumes that the instrumented local end-user software application 120 is also able to record the context of the end-user session in a local database 160. Depending on the implementation the local database may take various forms including a simple text file recording all the actions performed by end-user while running the supported end-user software application 120. The contextual database 160 is preferably stored in data storage means of the computer 100 of the end-user. The local end-user software application 120 is also equipped with a help button 20 like the instrumented Web page. Then, the foregoing described assistance scheme previously described unconditionally applies to this case too. The agent, through the agent software application 450 and under the control of the assistance service application 300, is also able to replay the customer session in the same conditions as previously discussed for the case of an online supported end-user software application 200 that is run from a server. To this end the instrumented local end-user software application 120 is also installed on agent's PC 400. Context of the end-user software application 120 run by the end-user is received from the local database 160.

Therefore, the key differences versus traditional hotlines and help desks are:
- With no modification at all of the application and architecture, help desk and hotline support can be done on a regular software application.
- Agent and customer are working on the same page at the same time and not on a same copy of a session. Each of them can see in real time what the other party is doing.

The possible applications of the invention are not limited to the hot lines, help desks and service centers used in the above examples to illustrate the invention. The invention also opens the door to all sorts of collaborative work between two or more geographically distant individuals, e.g., between two developers belonging to two different IT (information technology) organizations or departments without requiring any change of their respective IT infrastructures. For example, one may be an experienced user in charge of checking whether a delivered end-user software application works properly. The experienced user may work, e.g., in a quality department, in marketing or in a customer company or can be in charge of validating the development of an end-user software application. Then, provided the software application to be checked implements the part of the invention that records all actions needed to initiate another session with the same context another geographically distant individual, e.g., a developer of the code being checked can be involved to help solving the concerns and issues possibly, raised by whoever is in charge of checking the end-user software application.

Thus, in that use case related to collaborative work, the 'user' is more skilled than the 'agent' since the end-user is in charge of validating work done by the agent.

All functionalities described in the previous examples used to illustrate the invention (OLITA, help desk) still apply allowing the establishment of a very effective collaborative work session between the parties involved in spite of being geographically distant and possibly on completely different IT infrastructures.

The following illustrate an example of collaborative work.

In this use case the end-user is an experienced user responsible for checking whether a delivered application works properly. The end-user software application 200, 120 records all actions needed to initiate, on request of the assistance service application another session with the same context. The agent is a software developer responsible for the code checked by the end-user. At one time, the end-user finds that the application doesn't work properly. It may be a minor problem such as a misaligned field. The end-user clicks on the help button 20 provided on each instrumented page 121 of the end-user software application 200, 120, labeled here "Incident". This action gathers pieces of information keyed on the current page 121 not yet know from the software application server, and sends this information to the assistance service server 300 in order to initiate a support request. It may also create a tracking ticket in the bug tracker system such as Bugzilla from the Mozilla organization in which data gathered when the button was clicked and context data from the application server session are automatically recorded along with the identifier of the requestor.

End-user will be returned a waiting page up to the time agent handles the request.

Agent elects to handle the request with the client side 70 of the assistance service application, which initiates the same connection process as in "On Line Interactive Travel Agency". The client side 70 of the assistance service application initiates a request to the synchronization servlet 50 that returns an identifier uniquely identifying the context of the end-user in the end-user software application 200, 120 and the new pieces of information gathered when end-user pushed the help button 20. Then the client side 70 of the assistance service application displays on end-user's PC 100 the same page as on agent's PC 400 using:
- the identifier to set up the context; and
- the new pieces of information to reproduce end-user's keystrokes.

When connected, end-user will see, on her screen, a copy of agent's screen that will contain the same page 121 as on her screen in the same state.

Optionally agent may have two screens, one that is reproduced on end-user's screen and another one in which agent may change some parameters such as reference data, scripts and cascading style sheets or run a symbolic debugger to diagnose what's happening.

Optionally agent and end-user may invite their supervisors. They will be provided the URL of the page containing the applet that will allow them to see a copy of agent's screen like end-user.

Then, depending on the case: agent may fix end-user's problem; agent may propose a solution to end-user's problem; agent and end-user may agree on an understanding of the problem. The supervisors of agent and End-user may give their approval. The tracking ticket is updated accordingly.

The following summarizes the role of the various software components of the invention on server and client sides; for end-user of an application, and for agent of a remote help desk, hot line or service center supporting the application.

Processing Device of the End-User 100:
- End-user accesses a page on a supported remote site 200 (e.g.: an online travel agency or OLTA) using his/her PC installed browser.
- Web instrumented pages 121 are all equipped with a help button 20 that customer experiencing problems or needing to be assisted can click.
- After help button is clicked a waiting page is displayed on customer PC 100.
- When an agent has been assigned the task of helping customer a remote control client applet is loaded which automatically displays the agent's desktop, i.e., the connected page 90.

Processing Device of the Agent 400:
- Agent has a client application 70 that displays the pending tasks (i.e., the pending customer help requests). Agent clicks on a pending task to have it assigned to him/her.
- A new remote control password is generated for the remote control server 430 of agent's PC 400. The remote control server 430 is started or restarted and configured with the new generated password.
- The agent software application 200 enables to replay the session of the end-user when provided with the actions of the end-user that characterize the end-user session. The page displayed on the customer's screen is cloned or duplicated on the agent's screen.
- The waiting page displayed on the customer's screen is updated with a remote control client applet configured with the agent password and parameters to automatically connect to the agent's remote control server, through a newly open tunnel.

Online Web End-User Software Application 200
- This is a regular web end-user software application 200 implementing the two following mechanisms part of the invention. Every page 121 is instrumented to keep track of every action.
- A help button 20 is added on instrumented pages as mentioned above. When clicked it parses all the information inputted the current page and sends it to the assistance service application server 300, to request support and to provide to the application what has not been stored with the page context yet. This function is, e.g., implemented by an executable script or applet embedded in the web page and triggered when the customer clicks on the help button. This information is sent as parameters in the URL then analyzed on the agent's PC 400 to create a clone 122 of the instrumented web page 121 thus including the information inputted by the customer.
- A context function 10 in the online web end-user software application 200 stores in the contextual database 160 the session context at every exchange between the customer client application and the online web application 200.

It is worth noticing that, for a simple end-user software application 200, the context may not be needed, e.g., when there is no session, or if the needed information is all included in current pages and/or passed as parameter through the URL. In this case, no contextual database is needed. Also, authentication and security mechanism are implemented to authorize the assistance service application to access specific contextual information of customers.

Customer Waiting Page 80
- When the customer clicks on the help button a new browser window is started on his/her PC that displays a page provided by the Assistance service application 300 server until an agent is assigned the task of helping the customer.

Assistance Service Application 300
- Whenever a help request is received a new session is created in the server application. It is recorded in the task list displayed in the agent's Assistance service application client 70. When an agent selects a task from the list, the assistance service application server 300 changes the waiting page 80 to a connected page 90 in which an applet is embedded which automatically displays the screen (desktop) of the PC 400 of the agent.

Tunneling Application 60
- A tunnel is automatically set from the assistance service application server 300 to the PC 400 of the agent to allow secure connections between customer and agent through the firewalls.

Assistance Service Application 70
- When the agent selects a help request from the task list the following process takes place:
  - Record that the task is assigned in the assistance service application server 300.
  - Generate a password for the local remote control server. For sake of security, the password is randomly changed at each call. It is reset at completion of the current request processing.
  - Start the local remote control server 430, e.g., the server side of a desktop sharing software such as VNC.
  - Send the new password to the assistance service application server 300, to set up the remote control client applet.
  - Wait until customer get connected to the PC of the agent and display a 'welcome message'
  - Start a communication for instance through a webcam 422 and/or a chat application 424.

At any time, the agent can press an abort button 74 that drops the tunnel and stops the remote control server. The remote control connection can be passive, i.e. no action possible from the customer on the PC of the agent, or collaborative, i.e. to let the customer show items on the PC of the agent by moving his/her mouse and type strings of text for instance.

Figure 6A:
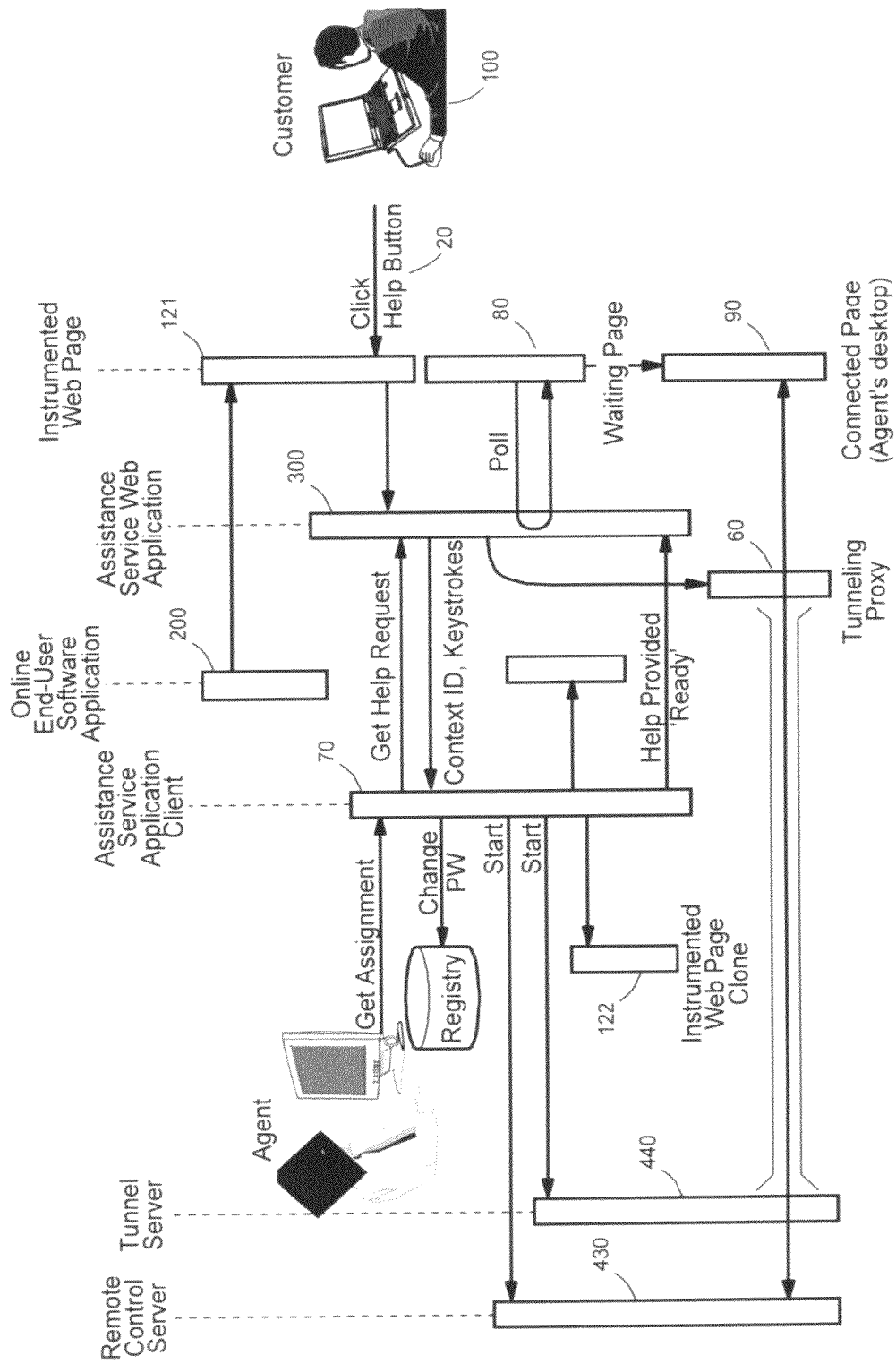
FIGS. 6a and 6b show the steps examples of methods to have an agent of the assistance center helping an end-user of, respectively, an online end-user software application and an instrumented local end-user software application running on the computer of the end-user.

The steps of the method of the invention are first illustrated in FIG. 6*a* for the case where customer loads an instrumented web page 121 from an online web end-user software application 200. The process starts when the customer experiencing difficulties with the end-user software application 200, and seeking support, clicks on the help button 20 provided on each instrumented web page.

The embedded script or applet activated when the customer clicks on the help button calls the waiting servlet 30 of the assistance service application with the context ID and a query string built from the entries made by customer in text boxes, radio buttons, etc. 125, of current web page.

The waiting servlet 30 returns a waiting page 80 that refreshes on the waiting servlet 30 until an agent is assigned the task of helping the customer having initiated the request.

To have the task assigned the agent must click on the get assignment button 72 of the assistance service application client 70 which calls the synchronization servlet 50 to ask for a help request. Then, the synchronization servlet 50:
- returns the context ID and the query string to the assistance service application client 70;
- configures the tunneling proxy 60 to tunnel the traffic to the PC of the agent.

Also, the assistance service application client 70:
- changes the password of the remote control server;
- starts the remote control server 430;

starts the tunneling server 440;
calls the agent with:
    the URL at which the customer clicked on the help button 20;
    the context ID of the customer;
    the query string of the customer.
So that the online web agent software application 200, which is the web application used by the end-user, returns the page in the context of the end-user. When the page is loaded a script function or an applet is called to populate it from the query string so that it becomes a clone 122 of the page 121 displayed on customer's screen.

Finally, the assistance service application client 70 calls the synchronization servlet 50 to notify that previous steps have been completed successfully and that help can be provided to the customer.

Then, the tunneling server 440 connects to the tunneling proxy 60. When the synchronization servlet 50 gets a notification that help can be provided from a assistance service application client 70, instead of continuing to return the waiting page the waiting servlet 30 returns a connected page with an applet that implements a remote control client e.g., the VNC client software or viewer, set up with a password parameter that contains the temporary password created by the assistance service application client 70. The applet connects through the tunnel between the tunneling proxy 60 and the tunneling server 440 to the remote control server 430 so that it displays the screen of the PC of the agent.

Figure 6B:
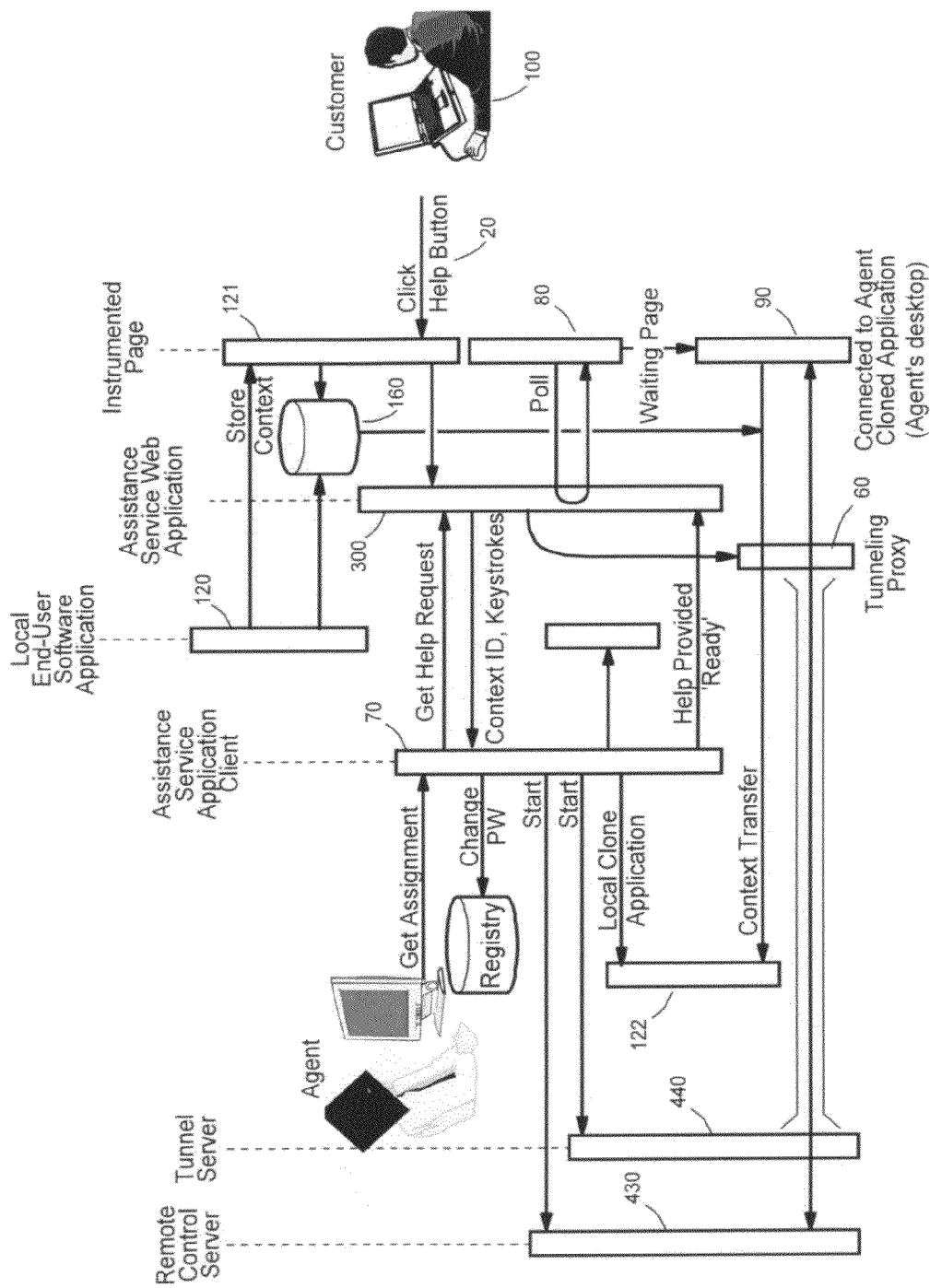

The steps of the method of the invention are also illustrated in FIG. 6b for the case where customer is requesting help for an end-user software application 120 running on his/her own PC. Such application is referred as local end-user software application 120. The steps of the method are the same except there is obviously no web end-user software application 200 to consider. Instead, as explained previously, the context in which the local end-user software application 120 is run by the customer is locally stored 160. Content of which is transferred to agent's PC 400 that runs an agent software application 450. Agent software application 450 is a copy of or has the same functionalities as the end-user software application 120, so that a clone 122 of what happens on customer PC 100 can be reproduced on agent's PC 400. The agent can thus fully support the end-user in the same conditions as discussed above.

Thus, in this embodiment, the process starts when the customer experiencing difficulties with the local software application 120, clicks on the help button 20 provided on each instrumented page 121 of the local end-user software application 120.

The embedded script or applet activated when the customer clicks on the help button calls the waiting servlet 30 of the assistance service application with the context ID and a query string built from the entries made by customer in text boxes, radio buttons, etc. 125, of current page.

The waiting servlet 30 returns a waiting page 80 that refreshes on the waiting servlet 30 until an agent is assigned the task of helping the customer having initiated the request.

To have the task assigned the agent must click on the get assignment button 72 of the assistance service application client 70 which calls the synchronization servlet 50 to ask for a help request. Then, the synchronization servlet 50:
    returns the context ID and the query string to the assistance service application client 70;
    configures the tunneling proxy 60 to tunnel the traffic to the PC of the agent.

Also, the assistance service application client 70:
    changes the password of the remote control server;
    starts the remote control server 430;
    starts the tunneling server 440;
    runs the local agent software application 450 that is installed on the computer 400 of the agent with the context ID of the customer and the query string of the customer.

Thus, the local agent software application 450 returns on display means of the agent the page in the context of the customer. When the page is loaded a script function or an applet is called to populate it from the query string so that it becomes a clone 122 of the page 121 displayed on customer's screen. Finally, the assistance service application client 70 calls the synchronization servlet 50 to notify that previous steps have been completed successfully and that help can be provided to the customer.

Then, the tunneling server 440 connects to the tunneling proxy 60. When the synchronization servlet 50 gets a notification that help can be provided from a assistance service application client 70, instead of continuing to return the waiting page the waiting servlet 30 returns a connected page with an applet that implements a remote control client e.g., the VNC client software or viewer, set up with a password parameter that contains the temporary password created by the assistance service application client 70. The applet connects through the tunnel between the tunneling proxy 60 and the tunneling server 440 to the remote control server 430 so that it displays the screen of the PC of the agent.

Although the invention is particularly adapted to provide assistance through public network, it can also be implemented through private networks.

From the above described use cases, it appears that the invention allows providing the end-user with efficient help without security of its computer and without requiring the previous installation of any cumbersome and specific software application in its computer. Thus, the invention significantly improves existing online assistance and collaborative work solutions whatever the way the client requests assistance e.g. by clicking on a help button, or by clicking on a URL link after having requested assistance through a phone call for instance.

What is claimed is:

1. A computer implemented method of providing assistance from an agent to an end-user, the method comprising:
    storing actions initiated by the end-user in a contextual database, the actions characterizing an end-user session with a first software application, the session being opened from a first data processing device of the end-user;
    receiving a request for assistance from the first data processing device;
    retrieving, with a server side of an assistance service application, all entries performed by the end-user that have not been processed or transmitted to the first software application;
    sending a request for assistance assignment from the server side of the assistance service application to a client side of the assistance service application;
    receiving an acceptance of assistance assignment in the server side of the assistance service application from the client side of the assistance service application;
    in response to receiving the acceptance of assistance assignment, sending the retrieved entries from the server side of the assistance service application to the client side of the assistance service application;

in response to receiving the request for assistance from the first data processing device, establishing a communication channel between the first data processing device and a second data processing device of the agent by configuring a tunnel between a server side of a desktop sharing application on the second data processing device and a client side of the desktop sharing application on the first data processing device;

duplicating the end-user session on the second data processing device based on the stored actions in the contextual database by opening a clone of the end-user session with a second software application on a third data processing device; and displaying the duplicated end-user session on the first data processing device with the desktop sharing application, wherein the server side of the assistance service application is located remotely from the first data processing device and the client side of the assistance service application is located on the second data processing device.

2. The method of claim 1 wherein duplicating the end-user session includes duplicating all entries already made by the end-user on a page of the end-user session currently displayed by the first data processing device and that have not been processed by the first software application.

3. The method of claim 1 wherein the end-user session is duplicated in response to the end-user requesting assistance by:

activating a help button embedded in a page of the end-user session that is displayed on the first data processing device; or requesting an executable link, receiving the executable link at the first data processing device, and accessing the executable link.

4. The method of claim 1 further comprising:

attributing, with the server side of the assistance service application, a context identifier that uniquely defines the end-user session; and in response to receiving the acceptance of assistance assignment, sending the context identifier to the client side of the assistance service application.

5. The method of claim 1 further comprising:

in response to receiving the request for assistance, sending a page to the first data processing device with the server side of the assistance service application, wherein the page includes an applet that embeds the client side of the desktop sharing application in the first data processing device.

6. The method of claim 1 further comprising:

in response to receiving the request for assistance, sending, with the server side of the assistance service application, a password that is associated to the end-user session to the first data processing device, the password being necessary to connect the first data processing device with the second data processing device.

7. The method of claim 1 further comprising:

after the request for assistance assignment from is received from the server side of the assistance service application, providing the agent with an option of accepting or rejecting the request for assistance assignment on the second data processing device, wherein the server side of the assistance service application is remotely located from the first data processing device, and the client side of the assistance service application is located in the second data processing device.

8. The method of claim 1 wherein the first software application is run on a software application server remotely located from the first data processing device.

9. The method of claim 8 wherein the first software application is a web-based application running from a web server.

10. The method of claim 8 wherein the server side of the assistance service application is run on the software application server.

11. The method of claim 8 wherein the server side of the assistance service application and the first software application are run on distinct servers.

12. The method of claim 1 wherein the first software application and the second software application are the same software application.

13. The method of claim 1 wherein the first software application is run on the first data processing device.

14. The method of claim 1 wherein the first software application is run on the first data processing device, the contextual database is stored on the first data processing device, and the first software application is linked to the contextual database and is configured to record the actions initiated by the end-user in the contextual database.

15. The method of claim 1 wherein establishing a communication channel between the first data processing device and the second data processing device of the agent by configuring the tunnel between the server side of a desktop sharing application on the second data processing device and the client side of the desktop sharing application on the first data processing device comprises:

starting a tunneling server at the second data processing device;

starting a tunneling proxy at the server side of the desktop sharing application; and connecting the tunneling server and the tunneling proxy.

16. A computer program product stored on a non-transitory computer readable storage medium comprising computer readable code that, when executed by at least a first processing device of an end-user and a second processing device of an agent, causes the first and second processing devices to:

store actions initiated by an end-user in a contextual database, the actions characterizing an end-user session with a first software application, the session being opened from the first data processing device;

receive a request for assistance from the first data processing device;

retrieve, with a server side of an assistance service application, all entries performed by the end-user that have not been processed or transmitted to the first software application;

send a request for assistance assignment from the server side of the assistance service application to a client side of the assistance service application;

receive an acceptance of assistance assignment in the server side of the assistance service application from the client side of the assistance service application;

in response to receiving the acceptance of assistance assignment, send the retrieved entries from the server side of the assistance service application to the client side of the assistance service application;

in response to receiving the request for assistance from the first data processing device, establish a communication channel between the first data processing device and the second data processing device by configuring a tunnel between a server side of a desktop sharing application on the second data processing device and a client side of the desktop sharing application on the first data processing device;

duplicate the end-user session on the second data processing device based on the stored actions in the contextual database by opening a clone of the end-user session with a second software application on a third data processing device; and display the duplicated end-user session on the first data processing device with the desktop sharing application, wherein the server side of the assistance service application is located remotely from the first data processing device, and the client side of the assistance service application is located in the second data processing device.

17. A system for providing an end-user of a first software application with assistance from an agent, the system comprising:

a first data processing device of the end-user, the first data processing device including a processor;

a second data processing device of the agent, the second data processing device including a processor;

a third data processing device including a processor; and program code stored in one or more of the first, second, and third data processing devices that, when executed by one or more of the processors, causes the system to:

store actions initiated by the end-user in a contextual database, the actions characterizing an end-user session with the first software application, the end-user session being opened from the first data processing device;

receive a request for assistance from the first data processing device;

retrieve, with a server side of an assistance service application, all entries performed by the end-user that have not been processed or transmitted to the first software application;

send a request for assistance assignment from the server side of the assistance service application to a client side of the assistance service application;

receive an acceptance of assistance assignment in the server side of the assistance service application from the client side of the assistance service application;

in response to receiving the acceptance of assistance assignment, send the retrieved entries from the server side of the assistance service application to the client side of the assistance service application;

in response to receiving the request for assistance from the first data processing device, establish a communication channel between the first data processing device and the second data processing device by configuring a tunnel between a server side of a desktop sharing application on the second data processing device and a client side of the desktop sharing application on the first data processing device;

duplicate the end-user session on the second data processing device based on the stored actions in the contextual database by opening a clone of the end-user session with a second software application on the third data processing device; and display the duplicated end-user session on the first data processing device with the desktop sharing application, wherein the server side of the assistance service application is located remotely from the first data processing device, and the client side of the assistance service application is located on the second data processing device.

18. The system of claim 17 wherein the third data processing device is a software application server remotely located from the first data processing device, and the first software application is run on the third data processing device.

19. The system of claim 17 wherein the first software application is run on the first data processing device, the contextual database is stored on the first data processing device, and the first software application is linked to the contextual database and is configured to record the actions initiated by the end-user in the contextual database.

20. The system of claim 17 wherein the program code is configured to configure the tunnel by:

starting a tunneling server at the second data processing device;

starting a tunneling proxy at the server side of the desktop sharing application; and connecting the tunneling server and the tunneling proxy.

* * * * *